H. HESS.
VEHICLE WHEEL.
APPLICATION FILED MAR. 4, 1907.

1,167,757.

Patented Jan. 11, 1916.

Witnesses

Inventor
Henry Hess
By his Attorney

UNITED STATES PATENT OFFICE.

HENRY HESS, OF WAWA, PENNSYLVANIA.

VEHICLE-WHEEL.

1,167,757.     Specification of Letters Patent.     Patented Jan. 11, 1916.

Application filed March 4, 1907. Serial No. 360,312.

*To all whom it may concern:*

Be it known that I, HENRY HESS, a citizen of the United States of America, residing in Wawa, in the county of Delaware and State of Pennsylvania, have invented certain new and useful Improvements in Vehicle-Wheels, of which the following is a specification.

My invention relates to vehicle wheels, and, more particularly, to the employment therein of a flexible or spring tire, which possesses the necessary resiliency, strength and durability, and obviates the well-known objections to tires of this class now in general use.

Broadly speaking, the invention comprises a vehicle wheel provided with a tire, so constructed as to afford equal resiliency throughout the circumference of the wheel. In the particular form selected for purposes of illustration, the tire proper is shown as formed with thickened or otherwise progressively reinforced sections between the spokes, it being so proportioned as to render the elasticity of the wheel the same throughout its extent, and whether any selected part of the circumference be located directly over a spoke or at any intermediate point between the spokes.

Figure 1:
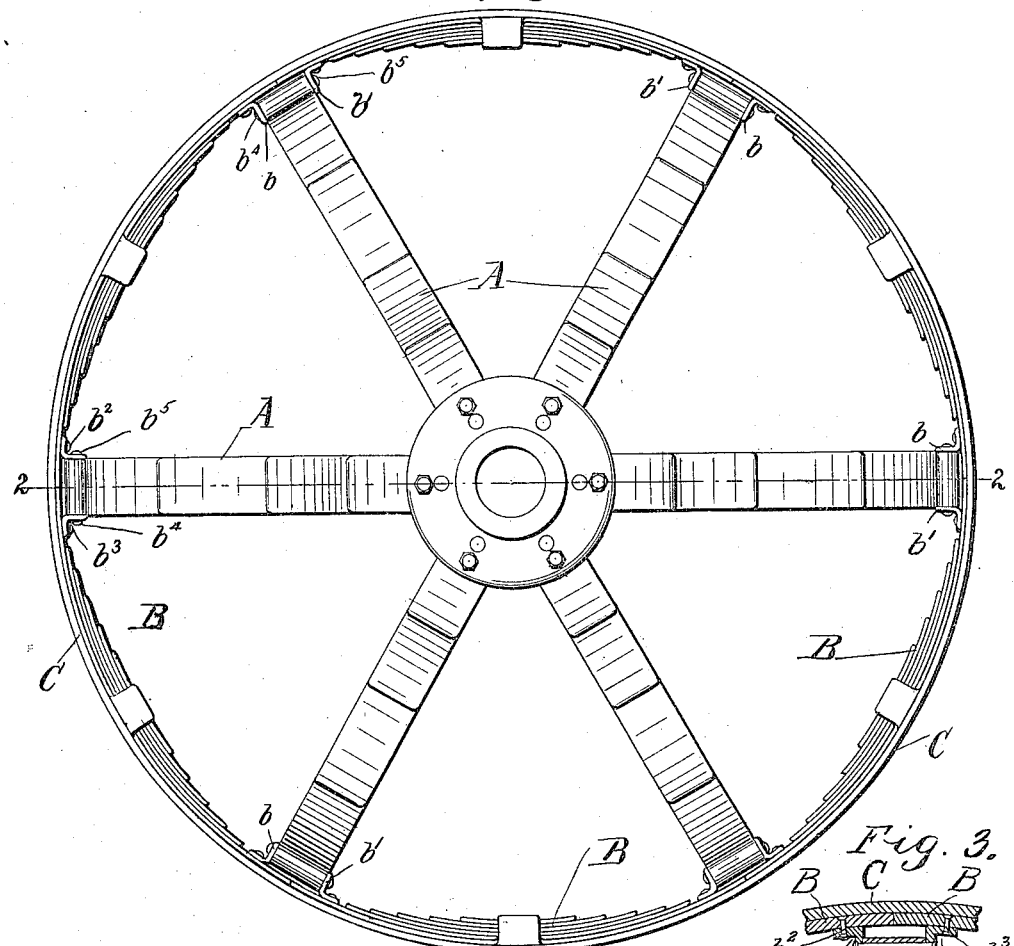
Figure 3:
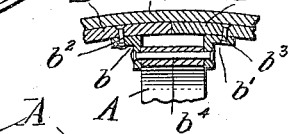
Figure 2:
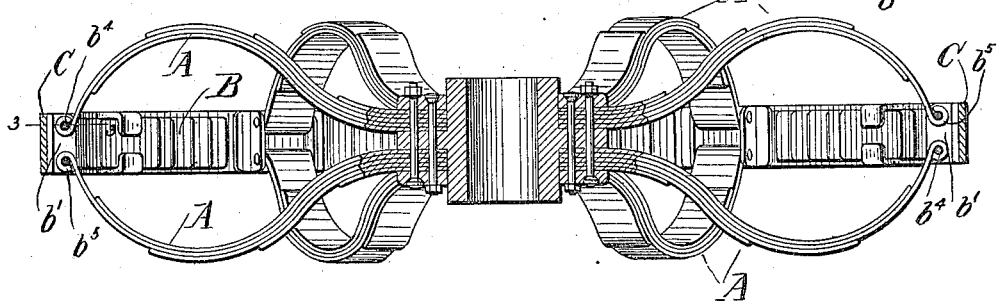

In the drawing, Figure 1 is a side view of my improved wheel, and Fig. 2 is a sectional view thereof, taken substantially on the line 2—2 of Fig. 1. Fig. 3 is a section on the line 3—3 of Fig. 2 on an enlarged scale showing how the adjacent ends of the tire sections are connected together and joined to the outer ends of the spoke members.

In the form illustrated in the drawing, the spokes A A are connected to the hub and to the tire B B. Each of the spokes A A consists of two members formed of leaf-springs, the thicker and inner portions of which are connected to the hub, and the thinner and outer portions to the tire. I do not limit myself, however, to the particular type of spokes illustrated. Elastic or resilient spokes of this character are known in the art and have been used in several different forms.

The tire sections B B, between the spokes, are shown as built up of parallel leaf-springs, suitably connected to each other and of diminished length toward the center, the said springs or laminæ being of such form and construction that when connected together, as shown, they will be under compression, and will offer resistance to the bend of the tire, the whole being so proportioned that each section B has its maximum strength at the central point, the strength gradually diminishing toward the points at which it is connected to the spokes, where it is at the minimum. I thus provide an elastic tire, the elasticity of which varies inversely as the distance from the spoke and thereby secure practically uniform spring-action throughout its entire circumference. If desired, in order to give more continuity and uniformity of outline, a light or auxiliary tire C may be applied outside of the main tire sections B B.

The tire sections B B may be composed of any appropriate material, such as wood or metal. I do not confine myself to the particular form of built-up tire sections shown and described, as these may be made in any suitable manner, provided always that they be progressively reinforced and strengthened so as to secure a uniform elasticity throughout their circumference, without reference to the location of their supporting means and without the aid of auxiliary devices.

As a convenient means for fastening the outer ends of the spokes to the tire sections, and for fastening the tire sections together end to end so that they may conjointly form the felly of the wheel, I employ at the adjacent ends of two tire sections, two brackets $b$ $b'$ riveted as at $b^2$ $b^3$ to the inner face of the adjoining ends of the two outer leaf-springs of the tire sections. These brackets have their radial portions extending inward and spaced apart, which radial portions are connected together by means of two rivets or pins $b^4$ $b^5$, around which the outer ends of the two members of the spokes A are bent and firmly fastened between the radial portions of the brackets.

By the application to the tire of the reinforcing members, that is the leaf springs, the tire at the points where these springs are located, is reinforced against the tendency to bend. In other words, the reinforcing means or members offer a resistance to the bending of the tire, such resistance, by reason of the character and form of the reinforcing members, being at a maximum at a point midway between the spokes, and gradually decreasing as the spokes are approached. In the operation of the wheel any tendency of the weight of the vehicle applied through the hub to flatten the tire at the top and bottom and to cause a comparatively sharp bending the tire at the sides, would, therefore, be resisted at the side points by the reinforcing means. Hence, the general effect of the reinforcing means is to reduce the deformation of the tire to a minimum, while at the same time preserving its resilient and cushioning qualities. And further, the effect is to maintain a general uniformity of resiliency throughout the circumference of the tire, notwithstanding the fact that the same is supported at predetermined points by the spokes.

Having thus described my invention, what I claim and desire to secure by Letters Patent of the United States is as follows:

In a vehicle wheel, the combination with a hub, yielding spokes, and a resilient tire, of a plurality of leaf springs, each comprising superposed connected plates of gradually decreasing length, said springs being applied to the tire at points between the spokes, with the longer plates next the tire, and being proportioned in relation to the spokes to offer a gradually decreasing resistance to the bend of the tire uniformly in both directions toward the spokes.

In testimony whereof, I have subscribed my name to this specification in the presence of two subscribing witnesses.

HENRY HESS.

Witnesses:
NETTIE L. HAHN,
M. M. CALLA.

Copies of this patent may be obtained for five cents each, by addressing the "Commissioner of Patents, Washington, D. C."